US008840533B2

(12) United States Patent
Prushinskiy et al.

(10) Patent No.: US 8,840,533 B2
(45) Date of Patent: Sep. 23, 2014

(54) RUBBING APPARATUS

(75) Inventors: Valeriy Prushinskiy, Yongin (KR); Len Kaplan, Yongin (KR); Se-Ho Cheong, Yongin (KR); Won-Sik Hyun, Yongin (KR); Heung-Yeol Na, Yongin (KR); Kyong-Tae Park, Yongin (KR); Min-Soo Kim, Yongin (KR); Seon-Hong Ahn, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 306 days.

(21) Appl. No.: 13/243,910

(22) Filed: Sep. 23, 2011

(65) Prior Publication Data

US 2012/0302414 A1    Nov. 29, 2012

(30) Foreign Application Priority Data

May 23, 2011    (KR) .................. 10-2011-0048502

(51) Int. Cl.
*F16C 13/00*    (2006.01)
*G02F 1/1337*    (2006.01)

(52) U.S. Cl.
CPC ................... *G02F 1/133784* (2013.01)
USPC ................... 492/28; 492/36; 492/45; 492/48; 349/187; 15/230; 15/230.16

(58) Field of Classification Search
USPC ........... 492/28, 30, 36, 45, 48; 349/126, 187; 15/230, 230.16
See application file for complete search history.

(56) References Cited

U.S. PATENT DOCUMENTS

| | | | | |
|---|---|---|---|---|
| 3,811,164 | A * | 5/1974 | Faress et al. | 492/48 |
| 4,964,338 | A * | 10/1990 | Fantoni et al. | 101/378 |
| 5,383,834 | A * | 1/1995 | Kanome et al. | 492/25 |
| 5,687,647 | A * | 11/1997 | Vrotacoe et al. | 101/375 |
| 5,842,419 | A * | 12/1998 | Puschnerat | 101/483 |
| 5,963,286 | A | 10/1999 | Ishibashi et al. | |
| 6,219,123 | B1 * | 4/2001 | Naito et al. | 349/126 |
| 6,357,354 | B1 * | 3/2002 | Dauer et al. | 101/477 |
| 6,371,023 | B1 * | 4/2002 | Francille | 101/375 |
| 6,524,173 | B1 * | 2/2003 | Nelson et al. | 451/178 |
| 6,862,061 | B2 * | 3/2005 | Horiuchi | 349/126 |
| 6,873,385 | B2 | 3/2005 | Matsumoto | |
| 6,972,817 | B2 * | 12/2005 | Kuan et al. | 349/126 |
| 7,016,000 | B2 * | 3/2006 | Kuan et al. | 349/126 |
| 7,072,016 | B2 * | 7/2006 | Kuan et al. | 349/126 |

(Continued)

FOREIGN PATENT DOCUMENTS

| | | | | |
|---|---|---|---|---|
| JP | 62280822 | A * | 12/1987 | G02F 1/133 |
| JP | 05-188375 | | 7/1993 | |

(Continued)

OTHER PUBLICATIONS

Machine English translation of JP 05188375.*

*Primary Examiner* — Essama Omgba
(74) *Attorney, Agent, or Firm* — Christie, Parker & Hale, LLP

(57) ABSTRACT

A rubbing apparatus including a rubbing roller including an opening portion at a region of a circumferential surface of the rubbing roller, an outlet portion connected to the opening portion and open to an outside of the rubbing roller, and a groove portion connected to the opening portion and penetrating into the rubbing roller along the opening portion; and a rubbing cloth substantially surrounding the circumferential surface of the rubbing roller.

15 Claims, 3 Drawing Sheets

(56) References Cited

U.S. PATENT DOCUMENTS

| | | |
|---|---|---|
| 7,442,494 B2 | 10/2008 | Park |
| 7,525,619 B2 * | 4/2009 | Cho et al. .................. 349/126 |
| 7,751,023 B2 * | 7/2010 | Wu et al. .................. 349/187 |
| 2003/0108712 A1 | 6/2003 | Tabira et al. |
| 2003/0160926 A1 * | 8/2003 | Horiuchi .................. 349/124 |
| 2004/0198182 A1 * | 10/2004 | Kuan et al. .................. 451/5 |
| 2006/0274245 A1 * | 12/2006 | Cho et al. .................. 349/126 |

FOREIGN PATENT DOCUMENTS

| | | | | |
|---|---|---|---|---|
| JP | 08-006026 | | 1/1996 | |
| JP | 2003005188 A | * | 1/2003 | ............ G02F 1/1337 |
| JP | 2004233443 A | * | 8/2004 | ............ G02F 1/1337 |
| KP | 10-2007-0064119 | | 6/2007 | |
| KR | 97-25089 | | 6/1997 | |
| KR | 10-2003-0019664 | | 3/2003 | |
| KR | 2007051507 A | * | 5/2007 | ............ G02F 1/1337 |

\* cited by examiner

RUBBING APPARATUS

CROSS-REFERENCE TO RELATED APPLICATION

This application claims priority to and the benefit of Korean Patent Application No. 10-2011-0048502, filed on May 23, 2011 in the Korean Intellectual Property Office, the entire content of which is incorporated herein by reference.

BACKGROUND

1. Field

Aspects of embodiments of the present invention relate to a rubbing apparatus of a liquid crystal display (LCD) apparatus.

2. Description of the Related Art

Due to the development of various electronic devices, such as mobile phones, personal digital assistants (PDAs), computers, and large-sized TV sets, demand for a flat panel display apparatus applicable to the electronic devices is increasing.

A liquid crystal display (LCD) apparatus capable of implementing mass production, easy driving means, and high image quality is one flat panel display apparatus applicable to the electronic devices.

Generally, the LCD apparatus includes an array substrate in which switching elements for driving pixel regions are formed, a color filter substrate facing the array substrate, and a liquid crystal layer disposed between the array substrate and the color filter substrate.

Liquid crystals included in the liquid crystal layer have optical anisotropy and different arrangements according to voltages applied thereto. Thus, an image is displayed on the LCD apparatus by applying a voltage to the liquid crystal layer, and controlling light transmittance of liquid crystals.

The array substrate includes gate lines and data lines arranged crossing each other, thin film transistors formed in regions where the gate lines and the data lines cross each other, pixel electrodes connected to the thin film transistors, and an arrangement layer coated to arrange liquid crystals. The color filter substrate includes a black matrix for preventing or reducing light leakage, a color filter for implementing color, a common electrode, and an arrangement layer coated to arrange liquid crystals.

The arrangement layers included in the array substrate and the color filter substrate are used to arrange liquid crystals in a predetermined direction. In this regard, a rubbing roller surrounded by a rubbing cloth is typically used to form a polyimide layer by hardening the arrangement layer and rubbing the polyimide layer at uniform orientation angle and intensity.

However, the polyimide layer is not uniformly rubbed due to end portions or seams of the rubbing cloth, or a scratch may occur due to impurities generated during a rubbing process, and thus image quality of the LCD apparatus is deteriorated.

SUMMARY

According to an aspect of embodiments of the present invention, a rubbing apparatus enhances performance of a liquid crystal display (LCD) apparatus by preventing or reducing deterioration of image quality of the LCD apparatus due to end portions of a rubbing cloth, or impurities generated during a rubbing process. According to another aspect of embodiments of the present invention, a rubbing apparatus has a simple construction.

According to an embodiment of the present invention, a rubbing apparatus includes: a rubbing roller including an opening portion at a region of a circumferential surface of the rubbing roller, an outlet portion connected to the opening portion and open to an outside of the rubbing roller, and a groove portion connected to the opening portion and penetrating into the rubbing roller along the opening portion; and a rubbing cloth substantially surrounding the circumferential surface of the rubbing roller.

End portions of the rubbing cloth may be outside of the opening portion such that the opening portion is not covered by the rubbing cloth.

A pressure in the groove portion may be less than a pressure outside of the rubbing roller.

The opening portion may be formed along a line that connects a region of the circumference of a first cross-section of the rubbing roller and a region of the circumference of a second cross-section facing the first cross-section.

The line may be a straight line connecting the first cross-section and the second cross-section.

The opening portion may include a plurality of holes formed in the circumferential surface of the rubbing roller.

Holes of the plurality of holes may have circular shapes.

The rubbing apparatus may further include a sinking portion in the circumferential surface of the rubbing roller.

The opening portion may be disposed in the sinking portion.

End portions of the rubbing cloth may be in the sinking portion.

The outlet portion may be formed in a center portion of a sectional surface of the rubbing roller.

The rubbing apparatus may further include an elastic member between the rubbing roller and the rubbing cloth and substantially surrounding the circumferential surface of the rubbing roller, and end portions of the elastic member may be outside of the opening portion such that the opening portion is not covered by the elastic member.

A thickness of the elastic member may be greater than 0.1 mm.

The end portions of the elastic member may be spaced apart from each other along an outside of the opening portion.

End portions of the rubbing cloth may substantially surround the end portions of the elastic member.

The rubbing roller may have a center through hole at the center thereof, and the rubbing apparatus may further include a rubbing roller support portion including a center axis in the center through hole.

The rubbing apparatus may further include a vacuum absorption device connected to the outlet portion.

BRIEF DESCRIPTION OF THE DRAWINGS

The above and other features and advantages of embodiments of the present invention will become more apparent by describing some exemplary embodiments thereof with reference to the attached drawings, in which.

DETAILED DESCRIPTION

Some exemplary embodiments of the present invention will be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various ways, all without departing from the spirit or scope of the present invention.

Figure 1:
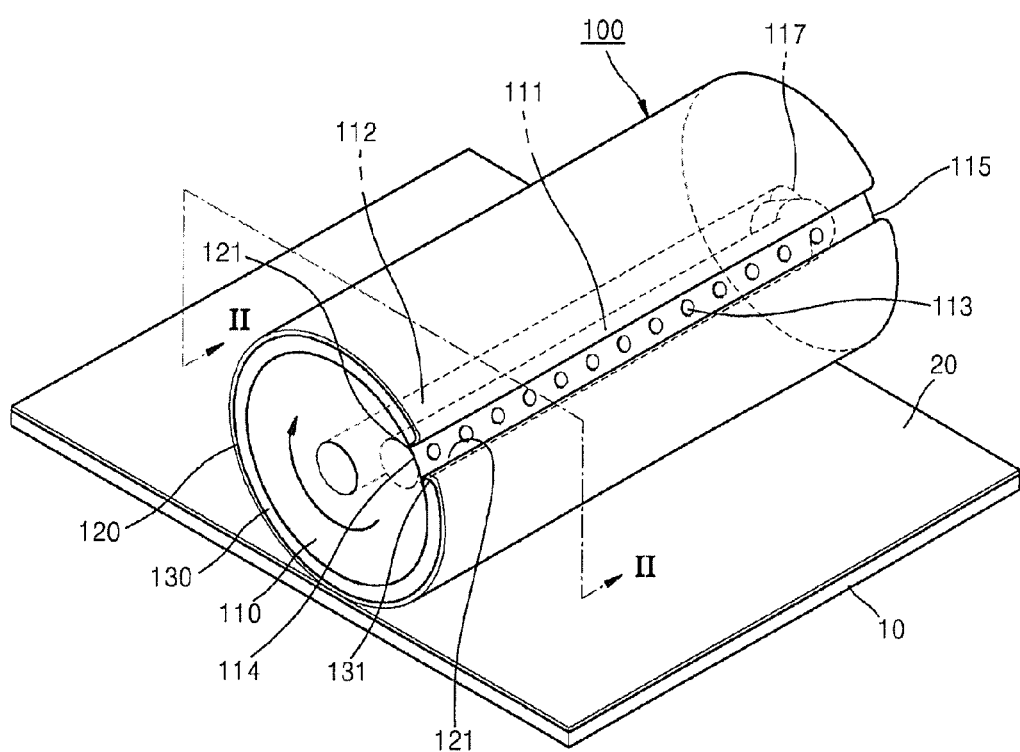
FIG. 1 is a schematic perspective view of a rubbing apparatus according to an embodiment of the present invention.
Figure 2:
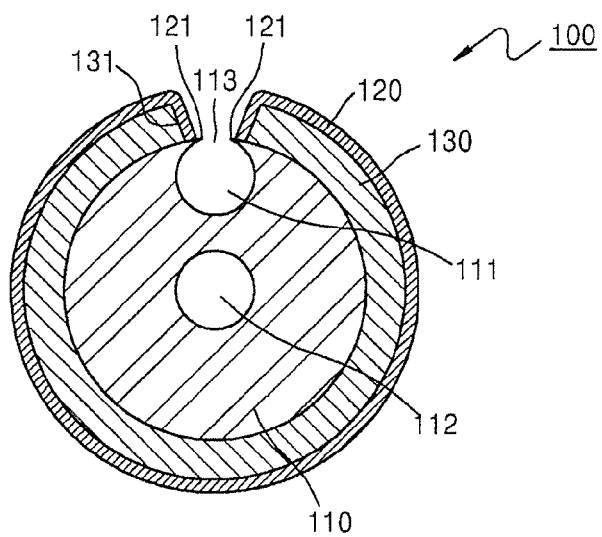
FIG. 2 is a schematic cross-sectional view of the rubbing apparatus of FIG. 1, taken along the line II-II'.

FIG. 1 is a schematic perspective view of a rubbing apparatus 100 according to an embodiment of the present invention. FIG. 2 is a schematic cross-sectional view of the rubbing apparatus 100, taken along the line II-II' of FIG. 1.

Referring to FIGS. 1 and 2, the rubbing apparatus 100 according to an embodiment of the present invention is disposed on a substrate 10 in which an arrangement layer 20 is formed on an upper portion of the substrate 10. The rubbing apparatus 100, in one embodiment includes a rubbing roller 110 including a groove portion 111 connected to an opening portion 113, a center through hole 112, a rubbing cloth 120 surrounding a circumferential surface of the rubbing roller 110, and an elastic member 130.

The substrate 10 may be a thin film transistor array substrate or a color filter substrate for a liquid crystal display (LCD) apparatus.

The arrangement layer 20 is formed on the substrate 10, and is used to arrange or align liquid crystals in a predetermined direction.

The arrangement layer 20 according to one embodiment of the present embodiment is formed of polyimide resin, but the present invention is not limited thereto.

The rubbing roller 110 is disposed on the arrangement layer 20, and rotates at high speed as a driving unit (not shown) is used to rotate the rubbing roller 110 in a rubbing direction, and thus the arrangement layer 20 is rubbed by the rubbing cloth 120. During a rubbing process, the arrangement layer 20 and/or the rubbing apparatus 100 may move. In one embodiment, the rubbing apparatus 100 moves, and the rubbing apparatus 100 may rotate in the rubbing direction from one side of the arrangement layer 20 and may move (e.g., concurrently with the rotating) in a horizontal direction, and thus the rubbing apparatus 100 rubs the arrangement layer 20.

In another embodiment, the rubbing apparatus 100 does not move, and the arrangement layer 20 disposed on the substrate 10 may horizontally move in the rubbing direction.

The rubbing roller 110, in one embodiment, includes the opening portion 113 along a line that connects a region 114 of the circumference of a first cross-section perpendicularly to the rotation direction of the rubbing roller 110 and a region 115 of the circumference of a second cross-section facing the first cross-section. Although, in one embodiment, the line may be a straight line, the present invention is not limited thereto.

The opening portion 113 may include a hole or a plurality of holes. The hole or holes may have various shapes, such as a circular shape, an oval shape, a rectangular shape, a triangular shape, etc.

The rubbing roller 110 includes an outlet portion 117 that is connected to the opening portion 113 and the groove portion 111 and is opened toward the outside of the rubbing roller 110. The rubbing roller 110 further includes the groove portion 111 that is connected to the opening portion 113 and penetrates into the rubbing roller 110 through the opening portion 113. The opening portion 113 is connected to the groove portion 111 inside the rubbing roller 110.

When the rubbing apparatus 100 rubs the arrangement layer 20, an outlet unit, such as a vacuum absorption device (not shown), is connected to the outlet portion 117 such that the groove portion 111 maintains a pressure (e.g., an atmospheric pressure) therein lower than that of the outside of the rubbing apparatus 100.

Figure 4:
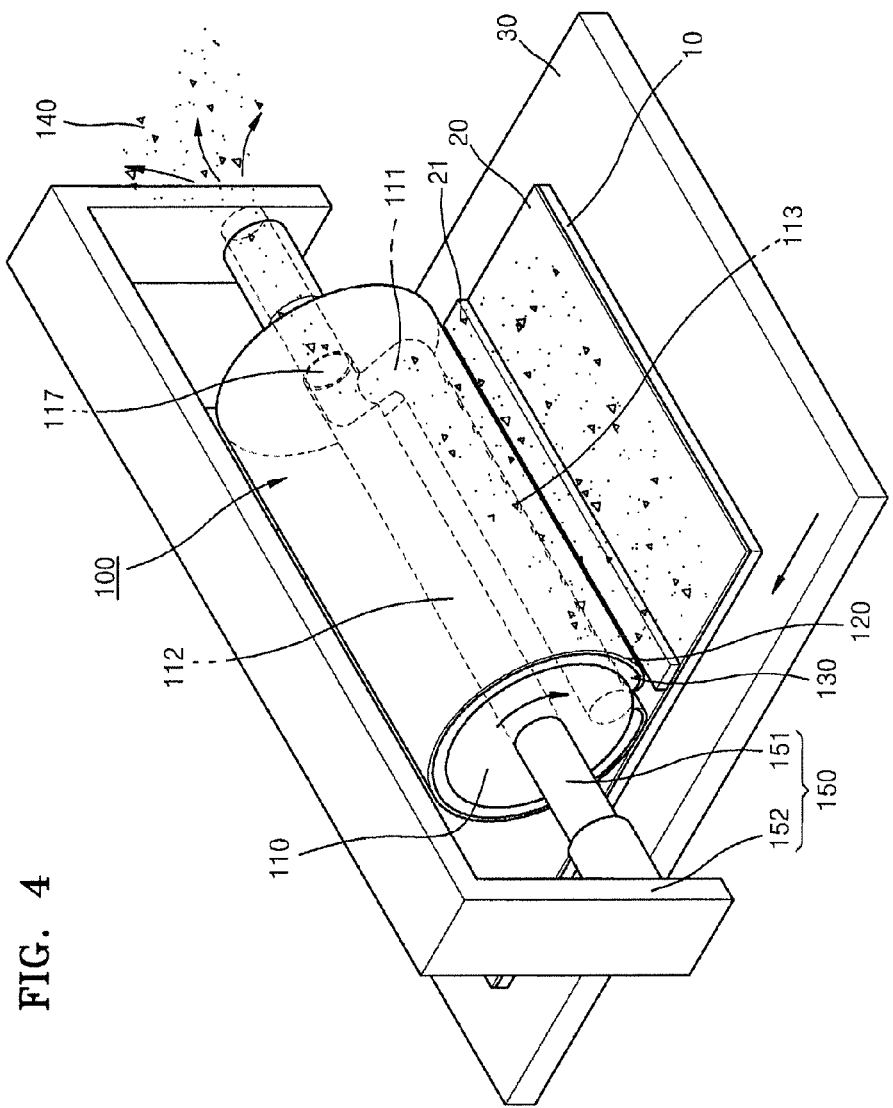
FIG. 4 is a schematic perspective view illustrating an operating state of the rubbing apparatus of FIG. 1.

In one embodiment, impurities 140 present on the arrangement layer 20 are absorbed or collected into the groove portion 111 having a lower atmospheric pressure than a pressure outside the rubbing apparatus 100 through the opening portion 113. With reference to FIG. 4, the impurities 140 move through the groove portion 111 connected to the inside of the rubbing roller 110, and are exhausted to the outside of the rubbing roller 110 through the outlet portion 117 that is opened toward the outside of the rubbing roller 110.

That is, in one embodiment, the impurities 140 present on the arrangement layer 20 are adhered to the rubbing cloth 120, and the rubbing apparatus 100 rubs the arrangement layer 20, thereby preventing or substantially preventing deterioration of image quality of the LCD apparatus due to a scratch on the arrangement layer 20 or non-uniform rubbing.

The outlet portion 117, in one embodiment, may be formed in the center portion of one end of the rubbing roller 110. Thus, the groove portion 111 is formed to connect the opening portion 113 and the outlet portion 117 in the rubbing roller 110.

In one embodiment, the outlet portion 117 is formed in the center portion of one end of the rubbing roller 110 such that a position of the outlet portion 117 does not change although the rubbing roller 110 rotates during the rubbing process.

The rubbing roller 110 further includes the center through hole 112, described in further detail below.

The rubbing cloth 120, in one embodiment, is a type of woven cloth, such as velvet or cotton flannel, and may be made of various materials such as rayon, nylon, polyester, cotton, etc. The rubbing cloth 120 directly contacts the arrangement layer 20 during the rubbing process and uses wool or woven cloth uniformly arranged on the surface thereof to rub the arrangement layer 20 at uniform orientation angle and intensity.

The rubbing cloth 120, in one embodiment, surrounds the circumferential surface of the rubbing roller 110.

In one embodiment, the rubbing cloth 120 is formed to surround a region of the rubbing roller 110 except for the opening portion 113 such that the rubbing cloth 120 does not cover the opening portion 113 of the rubbing roller 110. Thus, both ends 121 of the rubbing cloth 120 are disposed outside of the opening portion 113.

The rubbing apparatus 100, in one embodiment, further includes the elastic member 130 between the rubbing roller 110 and the rubbing cloth 120.

The elastic member 130 is formed of an elastic material, such as rubber or foam, in order to facilitate soft frictional contact between the rubbing apparatus 100 and the arrangement layer 20.

An electrode portion 21 in which an electrode such as a pixel electrode or a common electrode is disposed may protrude from the arrangement layer 20, as shown in FIG. 4. In this regard, if the rubbing roller 110 is made of metal, for example, and is not easily deformed, a rubbing force may not be uniformly applied to the arrangement layer 20 around the electrode portion 21 without the elastic member 130, and image quality of the LCD apparatus may be deteriorated, such as an occurrence of a light leakage.

Therefore, in one embodiment, the rubbing apparatus 100 further includes the elastic member 130 surrounding the circumferential surface of the rubbing roller 110 such that the rubbing roller 110 is slightly deformed when the arrangement layer 20 that is not planar is rubbed, thereby allowing a uniform or substantially uniform rubbing process to be performed throughout all regions.

In one embodiment, the elastic member 130 surrounds the circumferential surface of the rubbing roller 110, and both ends 131 of the elastic member 130 are disposed outside the opening portion 113 such that the opening portion 113 of the rubbing roller 110 is not covered.

A thickness of the elastic member 130 results in formation of a differential surface between the circumferential surface of the elastic member 130 and the rubbing roller 110. In this regard, both ends 121 of the rubbing cloth 120 are disposed to surround both ends 131 of the elastic member 130. In one embodiment, both ends 121 of the rubbing cloth 120 are disposed to entirely surround both ends 131 of the elastic member 130, as shown in FIGS. 1 and 2; however, the present invention is not limited thereto. That is, in another embodiment, both ends 121 of the rubbing cloth 120 may only partially surround both ends 131 of the elastic member 130.

Therefore, according to embodiments of the present invention, deterioration of the image quality of the LCD apparatus resulting from non-uniform rubbing due to a height difference at both ends 121 or a seam of the rubbing cloth 120 is prevented or substantially prevented.

In one embodiment, the rubbing cloth 120 is adhered onto the elastic member 130 via an adhesive agent or a double-sided tape.

In one embodiment, both ends 131 of the elastic member 130 may be inclined in a direction of the center of the rubbing roller 110, and the thickness of the elastic member 130 may be greater than 0.1 mm.

Figure 3:
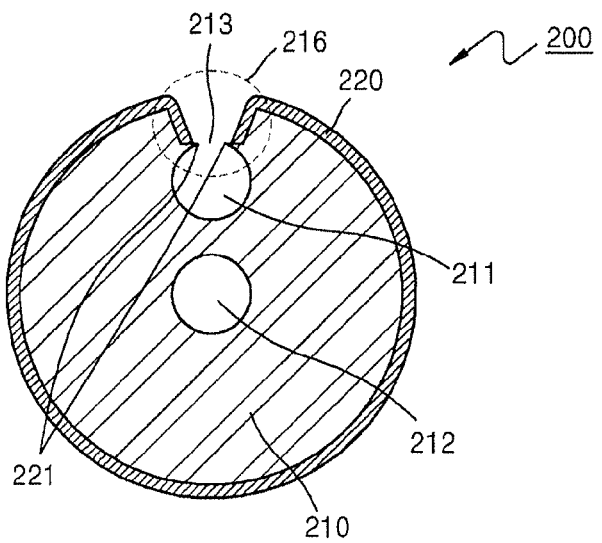
FIG. 3 is a schematic cross-sectional view of a rubbing apparatus according to another embodiment of the present invention.

FIG. 3 is a schematic cross-sectional view of a rubbing apparatus 200 according to another embodiment of the present invention. Differences between the rubbing apparatus 200 and the rubbing apparatus 100 described above and shown in FIGS. 1 and 2 are described below.

Referring to FIG. 3, the rubbing apparatus 200 according to another embodiment of the present invention includes a rubbing roller 210 including a groove portion 211 connected to an opening portion 213, a center through hole 212, and a rubbing cloth 220 surrounding the circumferential surface of the rubbing roller 210.

The rubbing roller 210 includes the groove portion 211 that is connected to the opening portion 213 and penetrates into the rubbing roller 210 through the opening portion 213.

Unlike the rubbing apparatus 100 described above and shown in FIGS. 1 and 2, the rubbing apparatus 200 does not include the elastic member 130, and the rubbing cloth 220 is directly disposed on the circumferential surface of the rubbing roller 210.

In one embodiment, a sinking portion 216 may be formed in one region of the circumferential surface of the rubbing roller 210. The sinking portion 216 is formed along the groove portion 211, and includes the opening portion 213 therein.

Both ends 221 of the rubbing cloth 220 are disposed in the sinking portion 216. In this regard, the both ends 221 of the rubbing cloth 220 may be disposed outside of the opening portion 213 such that the rubbing cloth 220 does not cover the opening portion 213.

In one embodiment, the rubbing cloth 220 may be adhered onto the rubbing roller 210 via an adhesive agent or a double-sided tape.

In one embodiment, the opening portion 213 in the rubbing roller 210 may be disposed in a region of the sinking portion 216 that is the closest to the center of the rubbing roller 210.

Although the rubbing apparatus 200 does not include the elastic member 130 and is not easily deformed, the rubbing apparatus 200 can remove impurities from the arrangement layer 20 and prevent or substantially prevent the arrangement layer 20 from being non-uniform because of both ends 221 of the rubbing cloth 220.

FIG. 4 is a schematic perspective view illustrating an operating state of the rubbing apparatus 100 of FIG. 1.

Referring to FIG. 4, the substrate 10 in which the arrangement layer 20 is formed may be disposed on a stage 30. The electrode portion 21 may protrude from the arrangement layer 20. The rubbing cloth 120 of the rubbing apparatus 100 is disposed to contact the arrangement layer 20 and rotates and rubs the arrangement layer 20.

In one embodiment, a center axis 151 of a rubbing roller support portion 150 is disposed along the center through hole 112 formed in the center portion of the rubbing roller 110, and both ends of the center axis 151 are rotatably supported by a support frame 152.

In one embodiment, the rubbing apparatus 100 and/or the stage 30 on which the substrate 10 is disposed may move in a horizontal direction in accordance with a rotation speed during a rubbing process. In this regard, the rubbing roller 110 applies a rubbing force to the rubbing cloth 120 in accordance with a distance between the rubbing roller 110 and the arrangement layer 20 and a rotation force of the rubbing roller 110, and the rubbing cloth 120 rubs the arrangement layer 20 by using the rubbing force.

When the rubbing apparatus 100 rubs a region of the arrangement layer 20 from which the electrode portion 21 protrudes, the elastic member 130 may be deformed in accordance with the protrusion such that the rubbing apparatus 100 uniformly or substantially uniformly rubs the arrangement layer 20.

Further, the impurities 140 are absorbed or conveyed into the opening portion 113 in the rubbing roller 110, and are exhausted through the outlet portion 117. The outlet portion 117 that is opened to the outside of the groove portion 111 may be connected to an external vacuum absorption device (not shown).

The outlet portion 117, in one embodiment, is formed in the center portion of one sectional surface of the rubbing roller 110. Thus, although the rubbing roller 110 rotates, a position of the outlet portion 117 does not change.

As described above, the rubbing apparatus according to embodiments of the present invention has a simple construction and effectively prevents or reduces deterioration of image quality of the LCD apparatus due to an end of a rubbing cloth or impurities generated during a rubbing process.

While the present invention has been particularly shown and described with reference to some exemplary embodiments thereof, it will be understood by those of ordinary skill in the art that various changes in form and details may be made therein without departing from the spirit and scope of the present invention as set forth in the following claims.

What is claimed is:

1. A rubbing apparatus comprising:
 a rubbing roller comprising an outlet portion at a center portion of a sectional surface of the rubbing roller, the outlet portion being a longitudinal bore open to an outside of the rubbing roller, a groove portion penetrating into the rubbing roller from a circumferential surface of the rubbing roller and extending along a longitudinal length of the rubbing roller, and an opening portion comprising a plurality of holes at the circumferential surface of the rubbing roller and arranged along the groove portion; and a rubbing cloth substantially surrounding the circumferential surface of the rubbing roller, wherein the outlet portion is connected to the groove portion inside the rubbing roller, and wherein the outlet portion communicates with the outside of the rubbing roller through the groove portion and through the plurality of holes.

2. The rubbing apparatus of claim 1, wherein end portions of the rubbing cloth are outside of the opening portion along the circumferential surface of the rubbing roller such that the opening portion is not covered by the rubbing cloth.

3. The rubbing apparatus of claim 1, wherein a pressure in the groove portion and in the outlet portion is less than a pressure outside of the rubbing roller.

4. The rubbing apparatus of claim 1, wherein the opening portion is formed along a line that connects a region of the circumference of a first cross-section of the rubbing roller and a region of the circumference of a second cross-section facing the first cross-section.

5. The rubbing apparatus of claim 4, wherein the line is a straight line connecting the first cross-section and the second cross-section.

6. The rubbing apparatus of claim 1, wherein holes of the plurality of holes have circular shapes.

7. The rubbing apparatus of claim 1, further comprising a sinking portion in the circumferential surface of the rubbing roller.

8. The rubbing apparatus of claim 7, wherein the opening portion is disposed at a bottom of the sinking portion, and the opening portion is narrower along a circumferential direction of the rubbing roller than each of the sinking portion and the groove portion.

9. The rubbing apparatus of claim 7, wherein end portions of the rubbing cloth are in the sinking portion.

10. The rubbing apparatus of claim 1, further comprising an elastic member between the rubbing roller and the rubbing cloth and substantially surrounding the circumferential surface of the rubbing roller, end portions of the elastic member being outside of the opening portion such that the opening portion is not covered by the elastic member.

11. The rubbing apparatus of claim 10, wherein a thickness of the elastic member is greater than 0.1 mm.

12. The rubbing apparatus of claim 10, wherein the end portions of the elastic member are spaced apart from each other along an outside of the opening portion.

13. The rubbing apparatus of claim 12, wherein end portions of the rubbing cloth substantially surround the end portions of the elastic member.

14. The rubbing apparatus of claim 1, wherein the rubbing roller has a center through hole at the center thereof, and the rubbing apparatus further comprises a rubbing roller support portion comprising a center axis in the center through hole.

15. The rubbing apparatus of claim 1, further comprising a vacuum absorption device connected to the outlet portion.

* * * * *